United States Patent

Shin et al.

[11] Patent Number: 6,072,874
[45] Date of Patent: Jun. 6, 2000

[54] SIGNING METHOD AND APPARATUS USING THE SAME

[75] Inventors: Kil-Ho Shin; Kenichi Kobayashi; Toru Aratani, all of Nakai-machi, Japan

[73] Assignee: Fuji Xerox Co., Ltd., Tokyo, Japan

[21] Appl. No.: 08/777,047

[22] Filed: Dec. 30, 1996

[30] Foreign Application Priority Data

Jan. 26, 1996 [JP] Japan .................................. 8-011568

[51] Int. Cl.[7] .................................................. H04N 7/167
[52] U.S. Cl. ........................ 380/231; 380/229; 380/232; 380/278
[58] Field of Search ................... 380/4, 23, 25, 380/231, 232, 229, 278

[56] References Cited

U.S. PATENT DOCUMENTS

| | | | |
|---|---|---|---|
| 5,050,213 | 9/1991 | Shear | 380/25 |
| 5,457,746 | 10/1995 | Dolphin | 380/4 |
| 5,537,473 | 7/1996 | Saward | 380/16 |
| 5,557,679 | 9/1996 | Julin et al. | 380/23 |
| 5,727,065 | 3/1998 | Dillon | 380/49 |
| 5,742,677 | 4/1998 | Pinder et al. | 380/4 |
| 5,825,876 | 10/1998 | Peterson, Jr. | 380/4 |
| 5,845,281 | 12/1998 | Benson et al. | 707/9 |

FOREIGN PATENT DOCUMENTS 4-334227  11/1992  Japan .

*Primary Examiner*—Gail O. Hayes
*Assistant Examiner*—Ho S. Song
*Attorney, Agent, or Firm*—Oliff & Berridge, PLC

[57] ABSTRACT

The present invention provides a signing apparatus used for signing by a user on usage information of a source provided in a format made available by the use of key information. The apparatus includes a unit for generating the usage information which is to be signed, a unit for performing a first computation by utilizing the key information which has been encrypted and the usage information, a unit for performing a second computation by utilizing a user's private key and a result of the first computation. The apparatus further includes a unit for performing a third computation by utilizing a result of the second computation, and thereby generating the key information which has been decrypted and a result of the computation performed on the usage information by utilizing the user's private key. The apparatus further includes a unit for making the source available by utilizing the decrypted key information.

13 Claims, 4 Drawing Sheets

SIGNING METHOD AND APPARATUS USING THE SAME

BACKGROUND OF THE INVENTION

1. Field of the Invention

The present invention relates to a method of electronic signing and an apparatus using the same and in particular relates to a method and apparatus for electronic signing which can confirm legitimacy of the signature without performing actual verification of the signature.

2. Discussion of the Related Art

It is now realized that a person who wants to receive some kinds of services such as using a computer program or watching and listening to the broadcasting program should electronically execute signature so that persons capable of receiving services may be limited to those who have executed the signature. Hereinafter such signature is called digital signature.

Japanese Patent Application Laid-Open No. Hei. 4-334227 (1992) discloses a method of forcing a user of charged broadcasting program to execute the digital signature on fee imposition information so that future denial of use of the charged program may be prevented. According to the invention of the Laid-Open publication, an encrypted program and a decryption key for decrypting the encrypted program are transmitted to a broadcasting program receiving decoder from the broadcasting station. The decoder receives the request for providing a program from the receiver, and notifies the receiver of the amount of the fee imposed on watching and listening to the program. If the amount of the fee is acceptable to the receiver, he/she executes digital signature with respect to the amount of the fee and returns it to the decoder. Then the decoder examines the returned digital signature of the amount of the fee to verify whether the signature is generated by a legitimate receiver. After legitimacy of the signature is verified, the decoder decrypts the requested program by the key obtained in advance, and provides the program to the receiver.

To execute such digital signature, public key encryption is used. That is, a public key pair is provided to each receiver and he/she publishes the public key, whereas he/she holds a private key in secret.

The digital signature on the data is generated by signature computation algorithm which has been published based on the input of data and the private key of a user. The verification of the digital signature is executed by a verification algorithm which has been also published based on the input of the data, signature on the data and the user's public key. For example, in the method disclosed by the Japanese Patent Application Laid-Open No. Hei. 4-334227, a basic Rivest-Shamir-Adleman (RSA) signature is employed and the signature computation algorithm and the verification algorithm are provided as follows:

Signature computation algorithm

Input: data x, a user's private key d and a public modulus n

Output: signature $y = x^d \bmod n$

Verification algorithm

Input: data x, signature y on the data x, a user's public key e and a public modulus n Output: true or false value z $$z = \begin{cases} \text{"true" when } x \equiv y^e \bmod n \\ \text{"false" when } \neg [x \equiv y^e \bmod n] \end{cases}$$

The legitimacy of the public key is verified by a certificate issued by a public certificate authority. The certificate and the certificate authority are prescribed in, for example, CCITT X. 509.

The certificate is issued by a certificate authority which the user belongs to, and is made by a pair of a body of the certificate containing information such as a distinguished name of the user, a user's public key, etc., and a digital signature made by using the private key of the certificate authority on the body of the certificate. The certificate is used for legitimately obtaining user's public key. That is, a verifier (other user or system) who receives presentation of the certificate verifies the signature of the certificate by utilizing the public key of the certificate authority. If the verification results in success, it can be confirmed that the user's public key prescribed in the certificate is formally approved by the certificate authority.

The legitimacy of public key of the certificate authority itself is also verified by the fact that it is obtained through a certificate issued by another certificate authority. That is, a verifier who is to verify the legitimacy of a user's public key obtains a public key of a certificate authority based on a certificate issued by the other certification issued by the certificate authority whose public key is already known to the verifier, and based on the public key of the certificate authority, the verifier further obtains a public key of another certificate authority. By repeating the above procedure for a number of times as necessary, the verifier finally obtains a public key of the certificate authority who have issued a certificate for the user's public key.

As described above, it is necessary to legitimately obtain the user's public key for verifying the digital signature executed by the user, and thereby it is necessary to verify certificates constituting a chain for the required number. The chain of certificates is called a certification path, which is different by each user.

If the verification of the signature is considered in the case of the method disclosed by the Japanese Patent Application Laid-Open No. Hei. 4-334227, to perform verification of user's signature on the amount of fee by the decoder, it is necessary to obtain the user's public key by traversing the certification path by repeating the above procedure, or to register the public key of the user in the decoder in advance.

Fee imposition on the use of services is not limited to the charged broadcasting program. For example, fee imposition on application programs used in computers is widely known. In addition, as the computer infrastructures such as networks are established, extended and developed, fee imposition on services related to computers shows a tendency to develop more and more.

The variation in styles in using computers has been wider than before. In particular, it is unnecessary for the user to stick to a single computer (terminal); therefore, he/she can use various kinds of applications on any computer available for him/her in any place, for example, in the office, at home, or in some place on a business trip.

In the case as described above where it cannot be predicted who will use a specific computer, it is not practical to register the user's public key when the computer or the fee-imposing device installed in the computer is manufactured. However, there occurs a problem of computing efficiency if the verification of the certification path is made in every use of applications. There also exists disadvantage in the manufacturing cost. The method of registering the public key in the computer or fee-imposing device is most practical, but there is then a weak point with respect to attacks such as "Impersonation" at the time of registration.

As described so far, in the case where function to prevent denial is desired to be improved by forcing the user to execute digital signature on usage information such as fee imposition information for the use of an application program implemented on a computer, verification of the digital signature must be performed on all such occasions. Thus there have been problems in the points of manufacturing cost, computation efficiency and security.

SUMMARY OF THE INVENTION

The present invention has been made in view of the above circumstances and has an object to provide a signing apparatus capable of reducing cost of verifying signature by making it possible to omit verification of digital signature in the case where the digital signature by the user is made on fee-imposing information, usage information and so forth of application programs or the like.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, the first aspect of a signing apparatus of the present invention used for executing signature by a user on usage information of a source provided in a format made to be available by the use of key information, comprises means for generating the usage information which is to be signed, means for performing a first computation by utilizing the key information which is encrypted and the usage information, means for performing a second computation by utilizing a user's private key and a result of the first computation, means for performing a third computation by utilizing a result of the second computation, and thereby generating the key information which has been decrypted and a result of the computation performed on the usage information by utilizing the user's private key, and means for making the source available by utilizing the decrypted key information.

In this structure, data of the key information and data of the usage information is concatenated by the first computation, and thereby if the key information is desired to be available, computation on the data of the usage information must be performed together by utilizing the private key. Accordingly, that the key information becomes available is equivalent to that the usage information is signed. Thus the legitimacy of the signature can be confirmed by the use of the source without actually performing verification of the signature itself.

In the second aspect of the present invention, for a signing apparatus used for executing signature by a user on usage information of a source provided in a format made to be available by the use of key information; a guarding device which guards inside information from external access, means for generating the usage information which is to be signed, means disposed in the guarding device for performing a first computation by utilizing the key information which is encrypted and the usage information, means for performing a second computation by utilizing a user's private key and a result of the first computation, means disposed in the guarding device for performing a third computation by utilizing a result of the second computation, and thereby generating the decrypted key information and a result of the computation performed on the usage information by utilizing the key information of the user, and means disposed in the guarding device for making the source available by utilizing the decrypted key information are provided.

In this structure, as same as that in the first aspect, the data of the key information is concatenated with the data of the usage information by the first computation, and thereby if the key information is desired to be available, computation of the data of the usage information must be performed together by utilizing the private key. Accordingly, that the key information becomes available is equivalent to that the usage information is signed. Thus the legitimacy of the signature can be confirmed by the use of the source without actually performing verification of the signature itself. Moreover, since the guarding device for guarding the inside information from the external access is provided so that the key information may not be leaked to the outside, improper obtaining of the key information by the user without signing can be prevented.

Moreover, in the above-described first and second aspects, means for storing a result of computation on the usage information by utilizing the user's private key may be provided, which enables the apparatus to hold a history of the signature.

Moreover, in the second aspect, it may be possible to provide means for decrypting the information which has been encrypted by a key unavailable for the user in the guarding device so that the encrypted key information may be further encrypted by the key unavailable for the user, provided to the means for decrypting, and then the first computation may be performed on the key information decrypted by the means for decrypting.

Moreover, in the first and second aspects of the present invention, means for performing first computation may assume the product of two large prime numbers, which are not known to the user, to be a modulus and generates a diagonal matrix having components, and then computes a different matrix which is the representation of the former matrix under an arbitrary basis. Note that the above operation of matrices are performed under the assumed modulus.

Moreover, in the first and second aspects of the present invention, a plurality of encrypted key information may be generated for a single source and content of the usage information pared with key information may be a fact that the key information decrypted immediately before is used, and the use of the source may be closed when the user refuses to execute signature on the usage information.

In the third aspect of the present invention, for an information processing apparatus having a source providing system and a source using system; means disposed in the source providing system for protecting and then outputting a source, means disposed in the source providing system for encrypting and outputting key information for cancelling the protection, a guarding device disposed in the source using system for guarding inside information from external access, means disposed in the source using system for generating usage information which is to be signed, means disposed in the guarding device for performing a first computation by utilizing the encrypted key information and the usage information, means disposed in the source using system for performing a second computation by utilizing a private key of a user and a result of the first computation, means disposed in the guarding device for performing a third computation by utilizing a result of the second computation, and thereby generating the decrypted key information and a result of the computation performed on the usage information by utilizing the user's private key, and means disposed in the guarding device for making the source available by utilizing the key information are provided.

In this structure, as same as that in the first and second aspects, the data of the key information is concatenated with the data of the usage information by the first computation, and thereby if the key information is desired to be available, computation of the data of the usage information must be performed together by utilizing the private key. Accordingly, that the key information becomes available is equivalent to that the usage information is signed. Thus the legitimacy of the signature can be confirmed by the use of the source without actually performing verification of the signature itself.

In the fourth aspect of the present invention, for a signing method used for signing by a user on usage information of a source provided in a format made to be available by the use of key information; steps of generating the usage information which is to be signed, performing a first computation by utilizing the encrypted key information and the usage information, performing a second computation utilizing a result of the first computation and a user's private key, performing a third computation by utilizing a result of the second computation, and thereby generating the key information which has been decrypted and a result of the computation on the usage information by utilizing the user's private key, and making the source available by utilizing the key information are provided.

In this structure, the data of the key information is also concatenated with the data of the usage information by the first computation, and thereby if the key information is desired to be available, computation of the data of the usage information must be performed together by utilizing the private key. Accordingly, that the key information becomes available is equivalent to that the usage information is signed. Thus the legitimacy of the signature can be confirmed by the use of the source without actually performing verification of the signature itself.

In the fifth aspect of the present invention, for a computer program product for use with a computer; a computer usable medium having computer readable program code means embodied in the medium for causing the computer to process signature executed by a user on usage information of a source provided in a format made to be available by the use of key information, computer readable program code means for causing the computer to generate usage information which is to be signed, computer readable program code means for causing the computer to perform a first computation by utilizing the key information which has been encrypted and the usage information, computer readable program code means for causing the computer to perform a second computation utilizing a result of the first computation and a private key of the user, computer readable program code means for causing the computer to perform a third computation by utilizing a result of the second computation, and thereby to generate the key information which has been decrypted and a result of the computation performed on the usage information by utilizing the private key of the user, and computer readable program code means for making the source available by utilizing the key information are provided.

In this structure, the data of the key information is also concatenated with the data of the usage information by the first computation, and thereby if the key information is desired to be available, computation of the data of the usage information must be performed together by utilizing the private key. Accordingly, that the key information becomes available is equivalent to that the usage information is signed. Thus the legitimacy of the signature can be confirmed by the use of the source without actually performing verification of the signature itself.

In the sixth aspect of the present invention, for a signature verification apparatus used for executing signature by a user on usage information of a source provided in a format made to be available by the use of key information, means for generating the usage information which is to be signed, means for performing a first computation by utilizing the encrypted key information and the usage information to be signed, means for performing a third computation by utilizing a result of a second computation for decrypting the key information and signing performed on a result of the first computation by utilizing a user's private key, and thereby generating the key information which has been decrypted and a result of the computation performed on the usage information by utilizing the user's private key, and means for making the source available by utilizing the decrypted key information are provided.

In the seventh aspect of the present invention, for a signing apparatus in the first aspect used for signing by a user on usage information of a source provided in a format made to be available by the use of key information, means for storing a user's private key, and means for performing the second computation by utilizing the user's private key utilizing the result of the first computation are further provided.

In the structures of the sixth and seventh aspects, the data of the key information is also concatenated with the data of the usage information by the first computation, and thereby if the key information is desired to be available, computation of the data of the usage information must be performed together by utilizing the private key. Accordingly, that the key information becomes available is equivalent to that the signature is executed on the usage information. Thus the legitimacy of the signature can be confirmed by the use of the source without actually performing verification of the signature itself.

Moreover, the signature verification apparatus of the sixth aspect and the signing apparatus of the seventh aspect may be held in the guarding device for guarding the inside information from the external access.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED EMBODIMENT

Preferred embodiment of a signing apparatus according to the present invention is now described in detail based on the drawings.

First Embodiment

Figure 1:
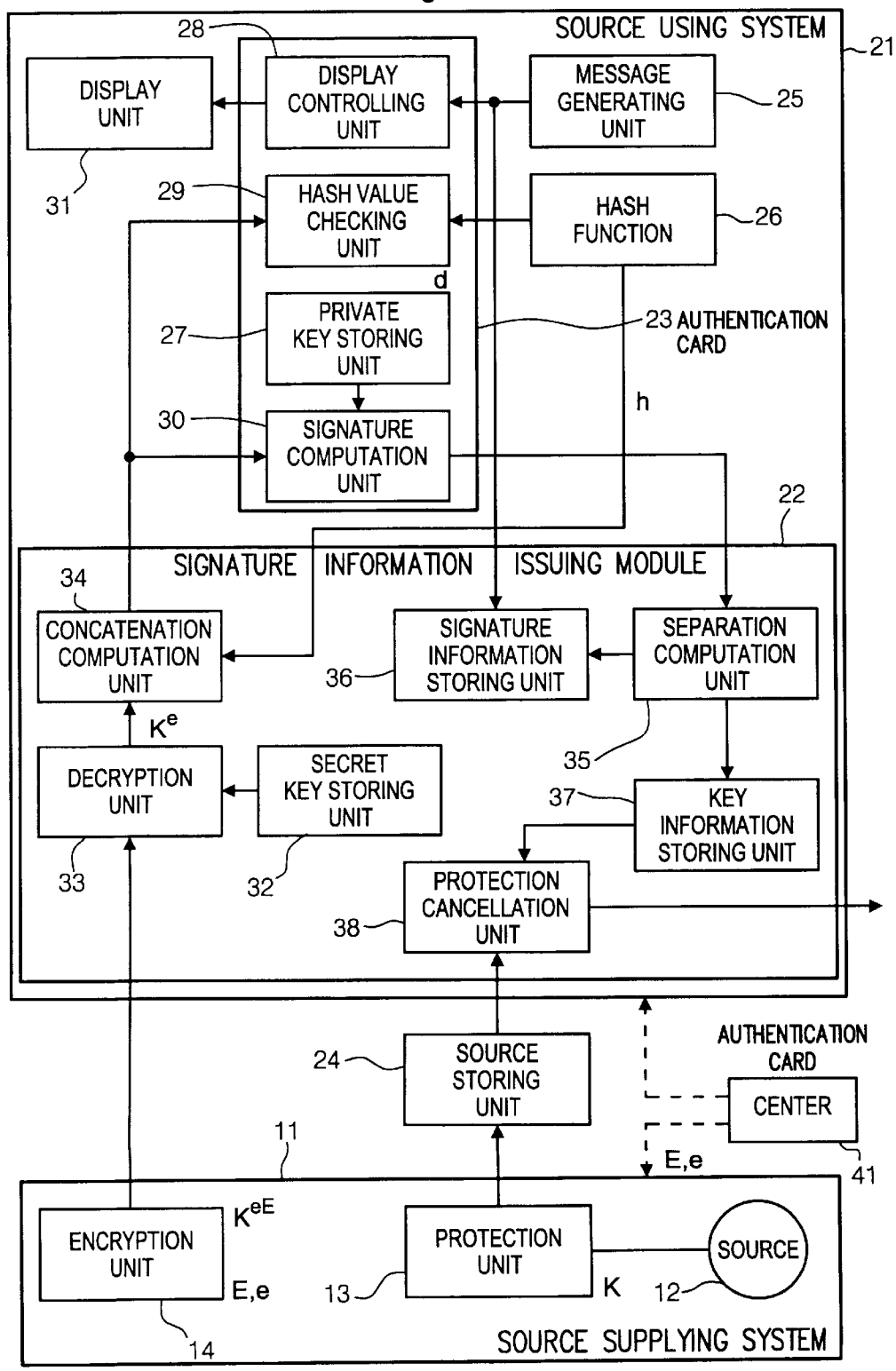
FIG. 1 is a block diagram showing the construction of an embodiment of a signing apparatus according to the present invention.

FIG. 1 shows an embodiment of the signing apparatus according to the present invention. A source providing system 11 provides a source 12 such as a computer program or a broadcasting program service. The source is provided to a source using system 21 through a protection unit 13. The source protection unit 13 protects the source by key information K. Therefore the source using system 21 cannot use the source without key information K. In the case of the computer program, execution cannot be started or continued. In the case of broadcasting program service, watching and listening to the program cannot be started or continued. An encryption unit 14 encrypts the key information K by using encryption keys E and e, and transmits it to the source using system 21. The keys E and e are public keys of a public encryption key pair, and secret keys corresponding thereto are D and d, respectively.

A center 41 is administrated by a person independent from and sharing no interests with those who concern in the source providing system 11 and the source using system 21, which provides the encrypting keys E and e to the person who administrates the source providing system 11, and provides a signature information issuing module 22 and an authentication card 23 to the user of the source using system 21. Details of the signature information issuing module 22 and the authentication card 23 will be described later.

The source using system 21 may be, for example, a personal computer or a decoder (fee imposition device) for the broadcasting programs, which comprises the signature information issuing module 22, the authentication card 23, a source storing unit 24, a message generating unit 25 and a one-way Hash function unit 26.

The authentication card 23 is an IC card which contains a CPU manufactured by the center 41 using a tamper-resistant module so that the inside information may not be leaked or falsified. The authentication card 23 comprises a private key storing unit 27 storing a private key d which makes a pair with the public key e, a display controlling unit 28 controlling the message to be displayed, a Hash value checking unit 29 and a signature computation unit 30. A display unit 31 displays the message under the control of the display controlling unit 28. The message includes the usage information such as fee imposition information.

The signature information issuing module 22 is also manufactured by the center 41 by utilizing the tamper-resistant module and thereby the inside information is not leaked or falsified. The signature information issuing module 22 comprises a secret key storing unit 32, a decryption unit 33, a concatenation computation unit 34, a separation computation unit 35, a signature information storing unit 36, a key information storing unit 37 and a protection cancellation unit 38.

The secret key storing unit 32 stores a secret key D which makes a pair with the public key E. The decryption unit 33 decrypts key information $K^{eE}$ encrypted by the public keys E and e by utilizing the secret key D, and generates data $K^e$. The concatenation computation unit 34 concatenates the data $K^e$ transmitted from the decryption unit 33 and a Hash value of the message by a predetermined computation and then transmits concatenated information to the authentication card 23. In the concatenated information, the encrypted key information $k^e$ is inseparable from the Hash value and they cannot be separated even if the key d stored in the authentication card 23 is used. In the authentication card 23, the computation is performed on the concatenated information by utilizing the key d, and the result of computation is provided to the separation computation unit 35.

The separation computation unit 35 separates the result of computation transmitted from the authentication card 23 into data regarding the key information K and data regarding the Hash value of the message by means of computation reverse to the concatenation computation in the concatenation computation unit 34. The data regarding the key information is provided to the key information storing unit 37 to be stored. Then the key information is further provided to the protection cancellation unit 38 which cancels protection of the source to make it available for the user. The data regarding the Hash value of the message is provided to the signature information storing unit 36 to be stored. The message (plain text) generated in the message generating unit 25 is also provided to the signature information storing unit 36 and stored therein.

Figure 2:
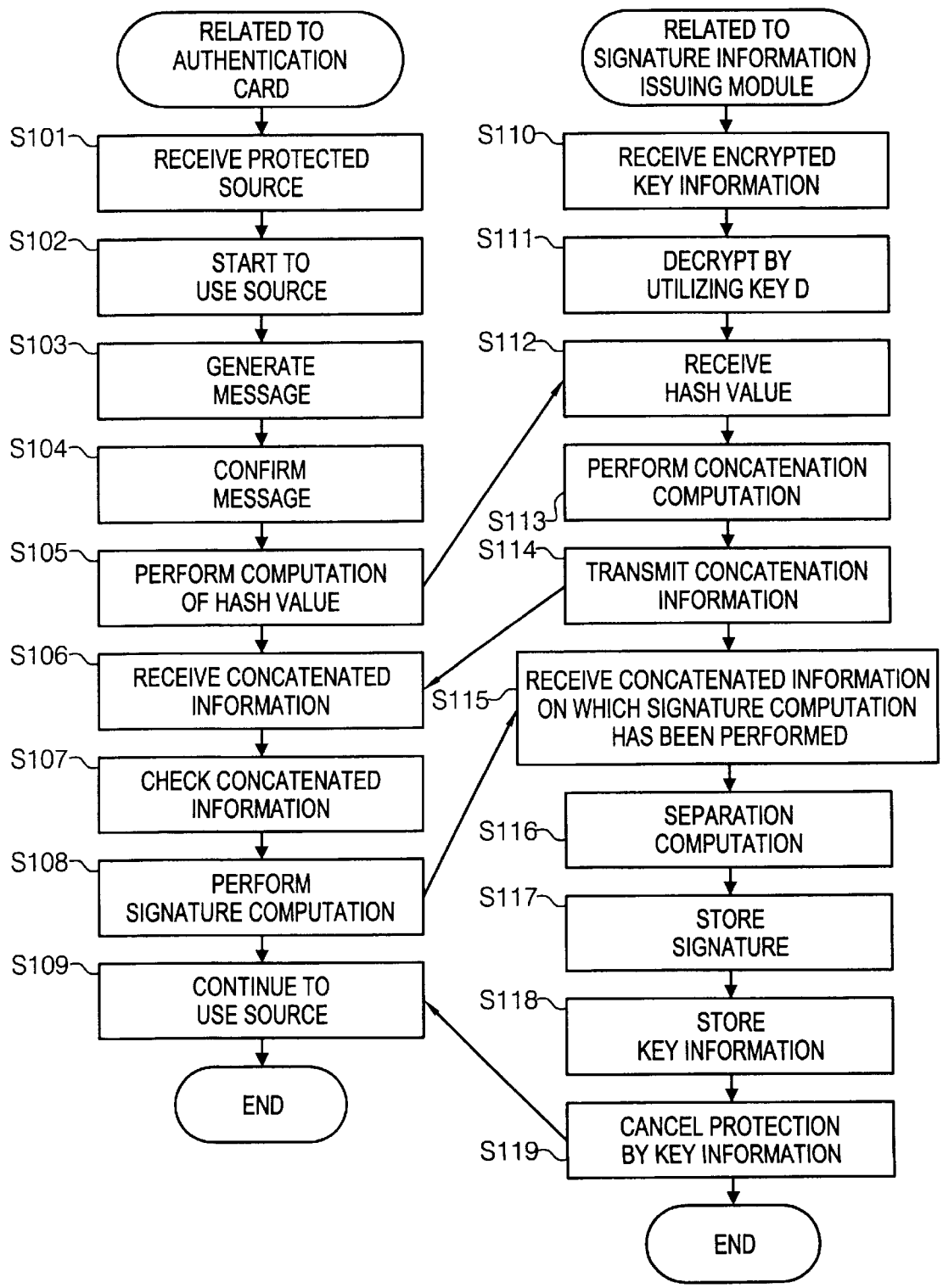
FIG. 2 is a flow chart illustrating operation of the embodiment shown in FIG. 1.

FIG. 2 illustrates operations of the embodiment shown in FIG. 1. Operations located right side of the figure are executed in relation to the signature information issuing module 22 and operations located left side of the figure are executed in relation to the authentication card 23. In advance of the use of the source, the protected source is stored in the source storing unit 24 (step 101). As the user starts to use, the message generating unit 25 generates the message including the usage information such as fee imposition. The user confirms the contents of the message displayed in the display unit 31 (steps 102–104). After the confirmation is completed, the Hash function unit 26 outputs a Hash value corresponding to the message (step 105). The Hash value is transmitted to the concatenation computation unit 34 of the signature information issuing unit 21, and also provided to the authentication card 23.

On the other hand, the encrypted key information $K^{eE}$ is received by the decryption unit 33 and decrypted into the data $K^e$ by utilizing the key D (steps 110 and 111). The concatenation computation is executed on the data $K^e$ and the Hash value. The concatenated information generated by the concatenation computation is provided to the authentication card 23 (steps 112–114). The authentication card 23 receives the concatenated information, and in the Hash value checking unit 29, the message is checked by utilizing the Hash value (steps 106 and 107). After the check is completed, the signature computation unit 30 performs the signature computation by using the secret key d (step 108), and the result of computation is provided to the separation computation unit 35 of the signature information issuing unit 21 (step 115).

The separation computation unit 35 performs separation computation on the concatenated information on which the signature computation has been performed and separates it into data regarding the signature and data regarding the key information K (step 116). The data regarding the signature is stored in the message storing unit 36 (step 117). The data regarding the key information is stored in the key information storing unit 37 and then provided to the protection cancellation unit 38 to be used for cancelling the protection of the source (steps 117–119).

The computation procedures used in this embodiment are now specifically described.

In the center 41, sufficiently large prime numbers p and q are generated in advance and retained, and n is employed so that n=pq is established. n is published, whereas p and q are kept as secret information.

Next, the center 41 issues a public key pair to the user according to the following procedure.

The center 41 performs computation of (d, e) so that the following expression may be established:

$$de \equiv 1 \; mod \; (p-1)(q-1)$$

then d is issued as the user's private key (secret key), and (e, n) is issued as the public key. The private key d is stored in the tamper-resistant module of the authentication card 23; therefore the people outside of the center 41 (including the user) are not able to know the private key d.

In the same way, the center 41 issues a public key pair which is independent from the user by generating (D, E) so that the following expression is satisfied:

$$DE \equiv 1 \; mod \; (p-1)(q-1)$$

then the secret key D is stored in the secret key storing unit 32 of the signature information issuing module 22 and E is published to the source supplier.

Here, key information required for using the source is assumed to be $K_1$. The source supplier encrypts the key information as follows and provides it to the user.

$$K_1^* = K_1^{eE} \; mod \; n$$

Since e and E are public information, the above encryption process is possible for everyone.

If the user wants to use the source, he/she should follow the procedures below.

Figure 3:
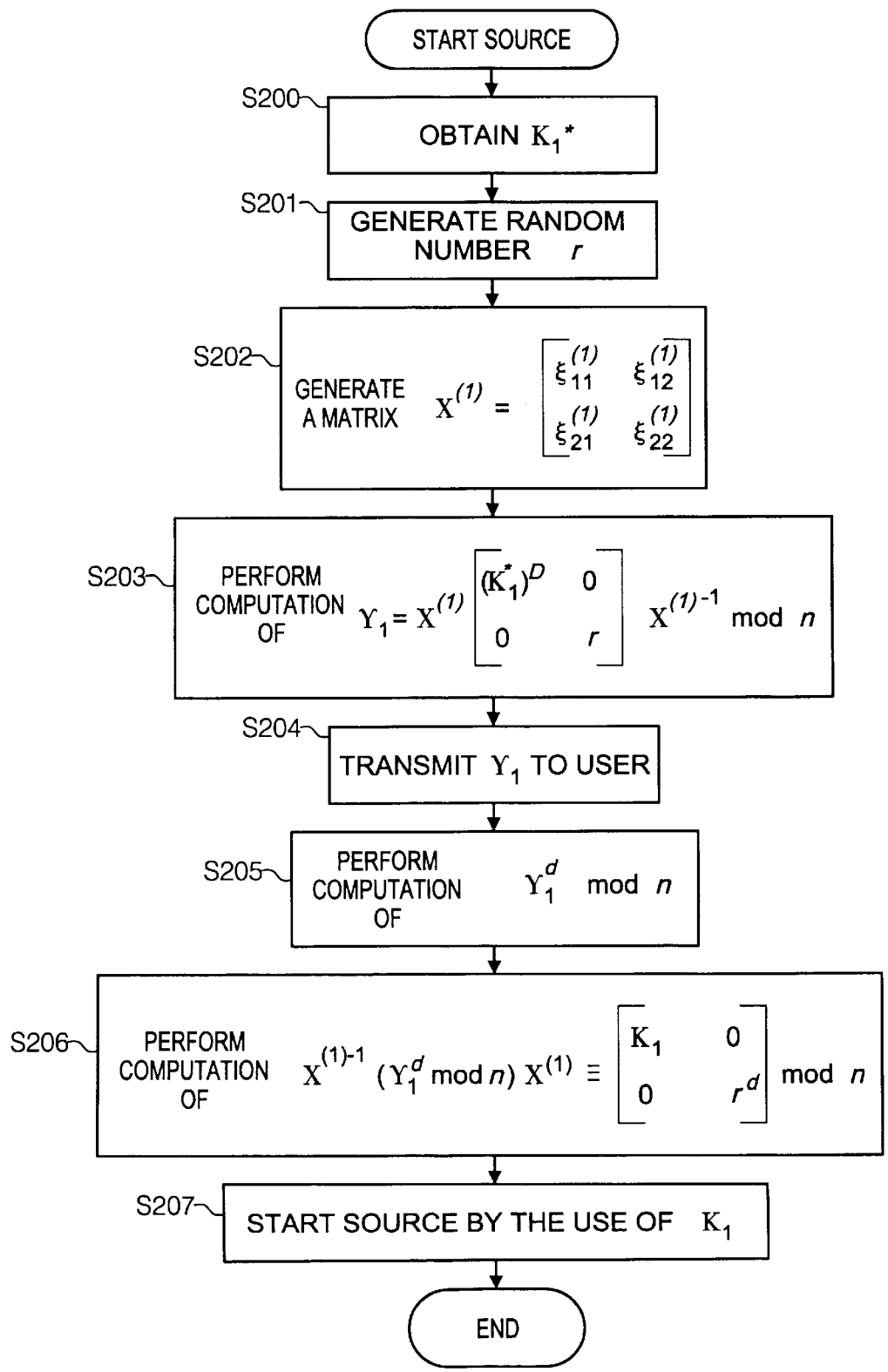
FIG. 3 is a flow chart illustrating concrete example of computation of the embodiment shown in FIG. 1.

The user requests the signature information issuing module 22 to start the source. The signature information issuing module 22 obtains the key information $K_1^*$ to perform computation of the key information $K_1$ which is necessary for starting the source. Then the procedures shown in FIG. 3 are executed.

(step 200) obtain $K_1^*$.

(step 201) generate a random number r.

(step 202) generate a regular 2-dimensional matrix $X^{(1)}$ having elements of Z/nZ as components at random:

$$X^{(1)} = \begin{bmatrix} \xi_{11}^{(1)} & \xi_{12}^{(1)} \\ \xi_{21}^{(1)} & \xi_{22}^{(1)} \end{bmatrix} \; \xi_{ij}^{(1)} \in Z/nZ$$

(step 203) perform computation of a 2-dimensional matrix $Y_1$ having elements of Z/nZ as components as follows:

$$Y_1 = X^{(1)} \begin{bmatrix} (K_1^*)^D & 0 \\ 0 & r \end{bmatrix} (X^{(1)})^{-1} mod \; n$$

$$\equiv X^{(1)} \begin{bmatrix} K_1^e & 0 \\ 0 & r \end{bmatrix} (X^{(1)})^{-1} mod \; n$$

(step 204) transmit $Y_1$ to the user:

(step 205) the user has the authentication card 23 perform the following computation by utilizing a program stored therein:

$y_1^d \; mod \; n$ and returns the result to the signature information issuing module 22.

(step 206) the signature information issuing module 22 performs computation of the key information $K_1$ as follows:

$$(X^{(1)})^{-1}(Y_1^d \; mod \; n)X^{(1)} \equiv \begin{bmatrix} K_1 & 0 \\ 0 & r^d \end{bmatrix} mod \; n$$

and after the computation is completed starts the source (step 207).

Figure 4:
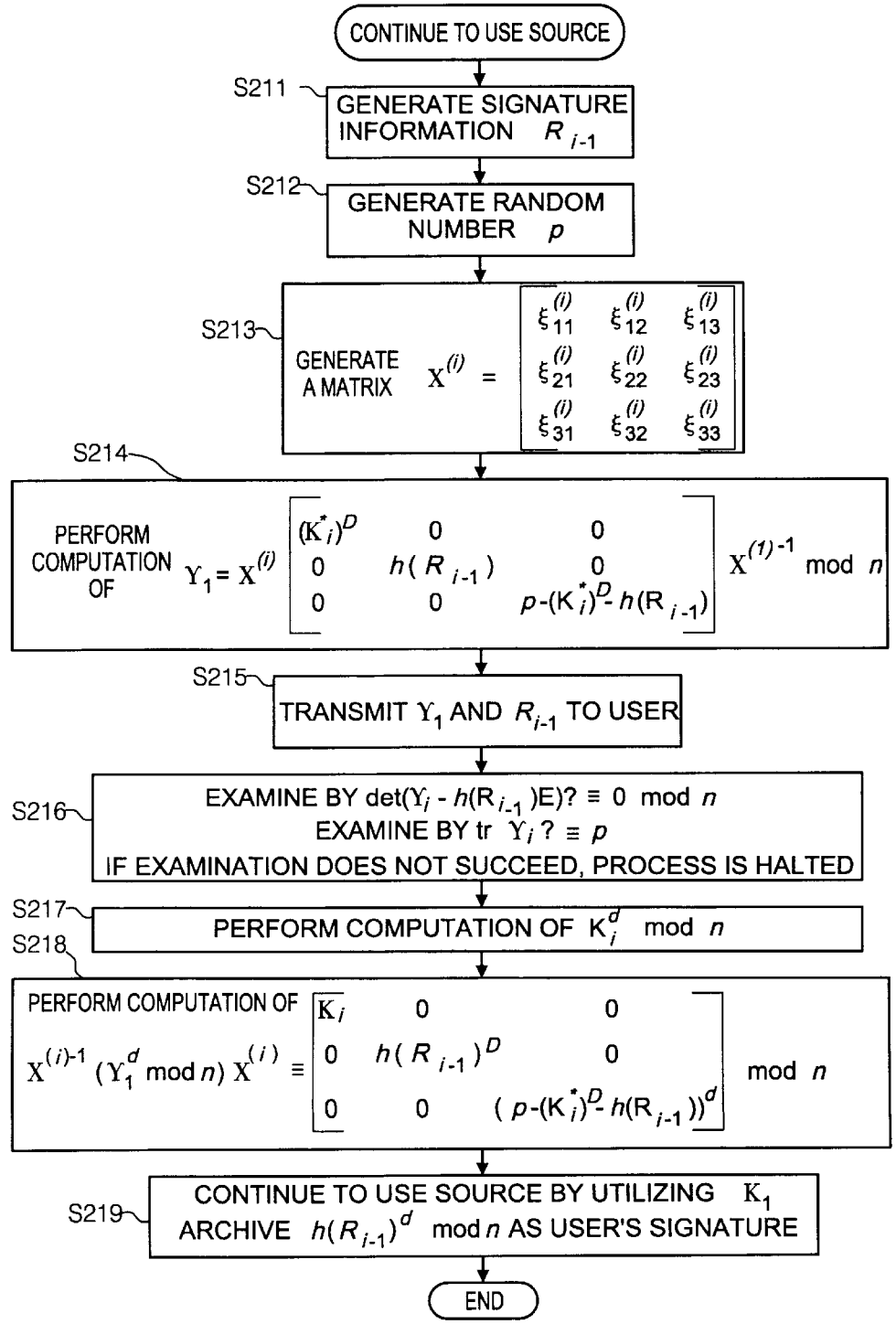
FIG. 4 is a flow chart illustrating another example of computation which follows the example of computation shown in FIG. 3.

So far it is assumed that there is a single key information for starting the source, but one more key information or a plurality of key information may be used for continuing to use the source. Here, the key information is referred to as $K_i$. Key information $K_1$ is obtained in the same way as described above for starting the source. With respect to key information $K_2$, computation is performed according to procedures shown in FIG. 4 after obtaining encrypted key information $K_2^*$ to continue execution of the source. FIG. 4 generally illustrates the cases where $i \geq 2$.

(step 211) generate signature information $R_1$ indicating the fact that the source is started, namely, the fact that the key information $K_1$ is decrypted.

(step 212) generate a random number p. Here, it is desirable to construct the generating method so that p may be generated according to the Coin-flipping protocol in cooperation with the user.

(step 213) generate a regular 3-dimensional matrix $X(^2)$ having elements of Z/nZ as components at random:

$$X^{(2)} = \begin{bmatrix} \xi_{11}^{(2)} & \xi_{12}^{(2)} & \xi_{13}^{(2)} \\ \xi_{21}^{(2)} & \xi_{22}^{(2)} & \xi_{23}^{(2)} \\ \xi_{31}^{(2)} & \xi_{32}^{(2)} & \xi_{33}^{(2)} \end{bmatrix} \; \xi_{ij}^{(2)} \in Z/nZ$$

(step 214) performs computation of a 3-dimensional matrix $Y_2$ having elements of Z/nZ as components as follows.

$$Y_2 = X^{(2)} \begin{bmatrix} (K_2^*)^D & 0 & 0 \\ 0 & h(R_1) & 0 \\ 0 & 0 & \rho - (K_2^*)^D - h(R_1) \end{bmatrix} (X^{(2)})^{-1} \; mod \; n$$

(step 215) Transmit $Y_2$ and $R_1$ to the user.

(step 216) The user confirms that the following expression for examination is established:

$$det \; (Y_2 - h(R_1)E)? \equiv 0 \; mod \; n$$

$$tr \; Y_2? \equiv p \; mod \; n$$

wherein "det" is a function providing a determinant of a matrix which is an argument and "tr" is a function providing a sum of diagonal components.

(step 217) performs computation of $Y_2^d \; mod \; n$ utilizing the program held in the authentication card, and return the result to the signature information issuing module.

(step 218) The signature information issuing module 22 performs computation as follows.

$$(X^{(2)})^{-1}(Y_2^d \; mod \; n)X^{(2)} \equiv \begin{bmatrix} (K_2^*)^{dD} & 0 & 0 \\ 0 & h(R_1)^d & 0 \\ 0 & 0 & (\rho - (K_2^*)^D - h(R_1))^d \end{bmatrix} mod \; n$$

-continued $$\equiv \begin{bmatrix} K_2 & 0 & 0 \\ 0 & h(R_1)^d & 0 \\ 0 & 0 & (\rho - (K_2^*)^D - h(R_1))^d \end{bmatrix} \mod n$$

The signature information issuing module 22 continues to use the source by utilizing the obtained key information $K_2$ (step 219). The $h(R_1)^d$ is the digital signature on the signature information $R_1$ by the user, which indicates that the key information $K_1$ is decrypted for starting the source.

With respect to the case where $i \geq 2$, decryption of the key information and generation of the signature on the information requiring signature can be executed by performing computation of $K_{i+1}$ and $h(R_i)^d$ in order in the same way as described above.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A signing apparatus used for signing by a user on usage information of a source provided in a format made to be available by the use of key information, comprising:
   means for generating said usage information which is to be signed;
   means for performing a first computation by utilizing said key information which has been encrypted and said usage information;
   means for performing a second computation by utilizing a private key of said user and a result of said first computation;
   means for performing a third computation by utilizing a result of said second computation, and thereby generating said key information which has been decrypted and a result of said computation performed on said usage information by utilizing said private key of said user; and
   means for making said source available by utilizing said decrypted key information, wherein said means for performing the first computation assumes the product of two large prime numbers to be a modulus, the two large prime numbers not being known to said user and, using said modulus, generates a first diagonal matrix having said encrypted key information and said usage information as components, and produces a second matrix from said first matrix, said second matrix being a different representation of said first matrix using an arbitrary basis.

2. A signing apparatus used for signing by a user on usage information of a source provided in a format made to be available by the use of key information, comprising:
   a guarding device for guarding inside information from external access;
   means for generating said usage information which is to be signed;
   means disposed in said guarding device for performing a first computation by utilizing said key information which has been encrypted and said usage information;
   means for performing a second computation by utilizing a private key of said user and a result of said first computation;
   means disposed in said guarding device for performing a third computation by utilizing a result of said second computation, and thereby generating said key information which has been decrypted and a result of said computation performed on said usage information by utilizing said private key of said user; and
   means disposed in said guarding device for making said source available by utilizing said decrypted key information, wherein said means for performing the first computation assumes the product of two large prime numbers to be a modulus, the two large prime numbers not being known to said user and, using said modulus, generates a first diagonal matrix having said encrypted key information and said usage information as components, and produces a second matrix from said first matrix, said second matrix being a different representation of said first matrix using an arbitrary basis.

3. The signing apparatus according to claim 1, further comprising:
   means for storing said result of said third computation performed on said usage information by utilizing said private key of said user.

4. The signing apparatus according to claim 2, further comprising:
   means disposed in said guarding device for decrypting information which has been encrypted by a key unavailable for said user, wherein said encrypted key information is further encrypted by said key unavailable for the user and provided to said means for decrypting, and said first computation is performed on said key information decrypted by said means for decrypting.

5. The signing apparatus according to claim 1, wherein a plurality of key information is provided for a single source, and a content of said usage information paired with key information is a fact that said key information decrypted immediately before is used, and the use of said source is closed when said user refuses to sign said usage information.

6. An information processing apparatus having a source providing system and a source using system, comprising:
   means disposed in said source providing system for protecting and outputting a source;
   means disposed in said source providing system for encrypting and outputting key information which cancels said protection;
   a guarding device disposed in said source using system for guarding inside information for external access;
   means disposed in said source using system for generating usage information which is to be signed;
   means disposed in said guarding device for performing a first computation by utilizing said encrypted key information and said usage information;
   means disposed in said source using system for performing a second computation utilizing a private key of a user and a result of said first computation; and
   means disposed in said guarding device for performing a third computation by utilizing a result of said second computation, and thereby generating said key information which has been encrypted and a result of said computation performed on said usage information by utilizing said private key of said user; and
   means disposed in said guarding device for making said source available by utilizing said key information, wherein said means for performing the first computation assumes the product of two large prime numbers to be a modulus, the two large prime numbers not being known to said user and, using said modulus, generates a first diagonal matrix having said encrypted key information and said usage information as components, and produces a second matrix from said first matrix, said second matrix being a different representation of said first matrix using an arbitrary basis.

7. A signing method used for signing by a user on usage information of a source provided in a format made to be available b the use of key information, comprising the steps of:

generating said usage information which is to be signed;

performing a first computation by utilizing said key information which is encrypted and said usage information;

performing a second computation by utilizing a result of said first computation and a private key of said user;

performing a third computation by utilizing a result of said second computation, and thereby generating said key information which has been decrypted and a result of said computation on said usage information by utilizing said private key of said user; and making said source available by utilizing said key information, wherein performing the first computation includes assuming the product of two large prime numbers to be a modulus, the two large prime numbers not being known to said user and, using said modulus, generating a first diagonal matrix having said encrypted key information and said usage information as components, and producing a second matrix from said first matrix, said second matrix being a different representation of said first matrix using an arbitrary basis.

8. A computer program product for use with a computer, said computer program product comprising:

a computer usable medium having computer readable program code means embodied in said medium for causing said computer to execute signature by a user on usage information of a source provided in a format made to be available by the use of key information, said computer program product having:

computer readable program code means for causing said computer to generate usage information which is to be signed;

computer readable program code means for causing said computer to perform a first computation by utilizing said key information which is encrypted and said usage information;

computer readable program code means for causing said computer to perform a second computation by utilizing a result of said first computation and a private key of said user;

computer readable program code means for causing said computer to perform a third computation by utilizing a result of said second computation, and thereby to generate a result of said computation performed on said key information which has been decrypted and said usage information by utilizing said private key of said user; and computer readable program code means for making said source available by utilizing said key information, wherein said computer readable program code means for causing the computer to perform the first computation assumes the product of two large prime numbers to be a modulus, the two large prime numbers not being known to said user and, using said modulus, generates a first diagonal matrix having said encrypted key information and said usage information as components, and produces a second matrix from said first matrix, said second matrix being a different representation of said first matrix using an arbitrary basis.

9. A signature verification apparatus used for signing by a user on usage information of a source provided in a format made to be available by the use of key information, comprising:

means for generating said usage information which is to be signed;

means for performing a first computation by utilizing said key information which is encrypted and said usage information which is to be signed;

means for performing a third computation by utilizing a result of a second computation for decrypting key information and signing performed on a result of said first computation by utilizing a private key of said user, and thereby generating said key information which is decrypted and a result of said computation performed on said usage information by utilizing said private key of said user; and means for making said source available by utilizing said decrypted key information, wherein said means for performing the first computation assumes the product of two large prime numbers to be a modulus, the two large prime numbers not being known to said user and, using said modulus, generates a first diagonal matrix having said encrypted key information and said usage information as components, and produces a second matrix from said first matrix, said second matrix being a different representation of said first matrix using an arbitrary basis.

10. The signature verification apparatus according to claim 9, further comprising:

a guarding device for guarding inside information from external access.

11. The signing apparatus according to claim 1, further comprising:

means for storing said private key of said user.

12. The signing apparatus according to claim 11, further comprising:

a guarding device for guarding inside information from external access.

13. A signing apparatus used for signing by a user on usage information which shows using a source provided in a format made to be available by the use of key information, comprising:

means for inputting said key information encrypted by a key which makes a pair with a private key of said user;

means for storing said private key of said user;

means for generating usage information which is to be signed;

means for concatenating said encrypted key information, inputted by said means for inputting said key information, and said usage information generated by said means for generating usage information;

signing means for executing decryption of said encrypted key information of said concatenated information by utilizing said private key of said user stored in said means for storing, and for signing said usage information generated by said means for generating said usage information of said concatenated information by utilizing said private key of said user stored in said means for storing;

means for separating said information processed by said signing means into said decrypted key information and said usage information which has been signed; and means for making said source available by utilizing said decrypted key information separated by said means for separating, wherein said means for concatenating assumes the product of two large prime numbers to be a modulus, the two large prime numbers not being known to said user and, using said modulus, generates a first diagonal matrix having said encrypted key information and said usage information as components, and produces a second matrix from said first matrix, said second matrix being a different representation of said first matrix using an arbitrary basis.

* * * * *